United States Patent
Marsh

[15] 3,662,780
[45] May 16, 1972

[54] FLUID FLOW DIRECTING STRUCTURE FOR PRESSURE VESSEL

[72] Inventor: Robert E. Marsh, 12200 Montecito Rd., Apt. D-309, Seal Beach, Calif. 90740

[22] Filed: May 25, 1970

[21] Appl. No.: 48,680

Related U.S. Application Data

[62] Division of Ser. No. 679,304, Oct. 31, 1967, Pat. No. 3,557,827.

[52] U.S. Cl..............................137/590, 210/191, 210/288, 210/456, 220/3, 220/83, 259/18
[51] Int. Cl.........................................................B01d 27/12
[58] Field of Search..................137/590, 592; 220/3, 63, 83, 220/67; 126/362; 210/191, 279, 288, 304, 456; 259/4, 18

[56] References Cited

UNITED STATES PATENTS

| | | | |
|---|---|---|---|
| 1,978,015 | 10/1934 | Erdman | 137/590 X |
| 1,991,830 | 2/1935 | Watson | 137/592 X |
| 2,848,133 | 8/1958 | Ramberg | 220/3 |
| 3,158,177 | 11/1964 | Schulz et al | 137/592 |
| 3,171,563 | 3/1965 | Bernd | 220/63 |
| 3,172,252 | 3/1965 | Boek | 220/3 |
| 3,246,794 | 4/1966 | Marshall | 220/3 X |
| 3,311,253 | 3/1967 | Pechacek | 220/3 |
| 3,319,791 | 5/1967 | Horne | 210/288 X |
| 3,404,796 | 10/1968 | Dobbins et al. | 220/83 X |

Primary Examiner—William R. Cline
Attorney—Fowler, Knobbe & Martens

[57] ABSTRACT

A light weight filament wound pressure vessel. The vessel includes a central cylindrical shell and a pair of end caps adapted to fit into the opposite ends of the shell. Each of the end caps includes a convex, dome-like upper portion, a cylindrical skirt depending from the upper portion and integrally connected thereto, and an annular land connected to the edge of the cylindrical skirt. The cylindrical skirts are of substantially the same outer diameter as the central shell. The lands have an outer diameter which is slightly less than the inner diameter of the central shell so that the junction between the lands and the skirt forms a shoulder having a radial dimension substantially equal to the thickness of the central shell. Each land has an annular groove therein for carrying a resilient O-ring. The O-rings are of a slightly larger diameter than the outer diameter of the lands so that they sealingly engage the inner wall of the central shell when the lands are inserted into the central shell. The central shell and cylindrical skirts of the end caps form a smooth external junction. The assembly is overwound with a fiberglass filament to provide the desired bursting strength of the vessel. The lands may be integrally connected to the skirts or mounted on a collector ring. In one embodiment of the pressure vessel of this invention a fluid flow directing means is integrally connected to the internal surfaces of one of the end caps for guiding fluids through the vessel and eliminating "channeling." This embodiment of the invention is particularly adapted for use as a water conditioning tank.

8 Claims, 8 Drawing Figures

Patented May 16, 1972
3,662,780
3 Sheets-Sheet 1
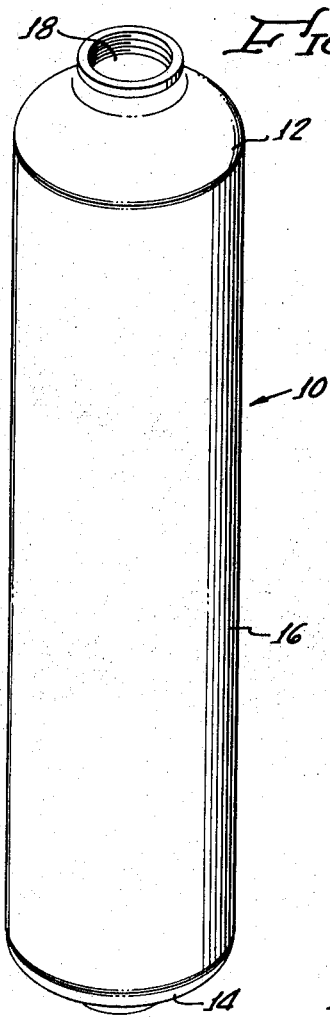
FIG. 1.
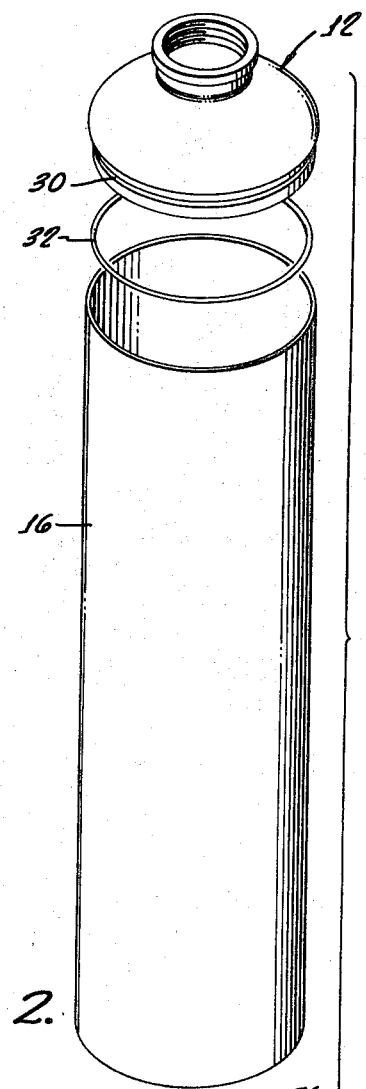
FIG. 2.
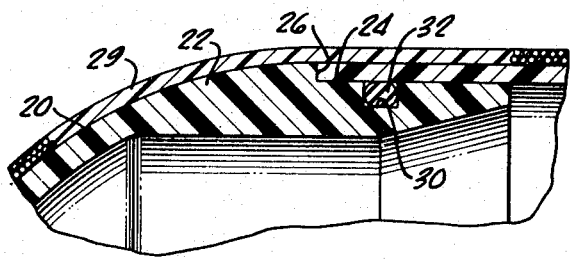
FIG. 4.
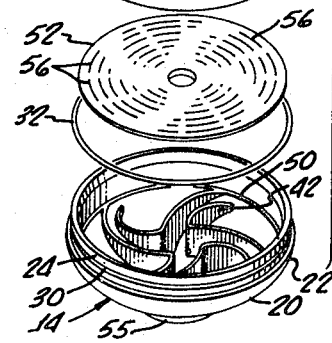

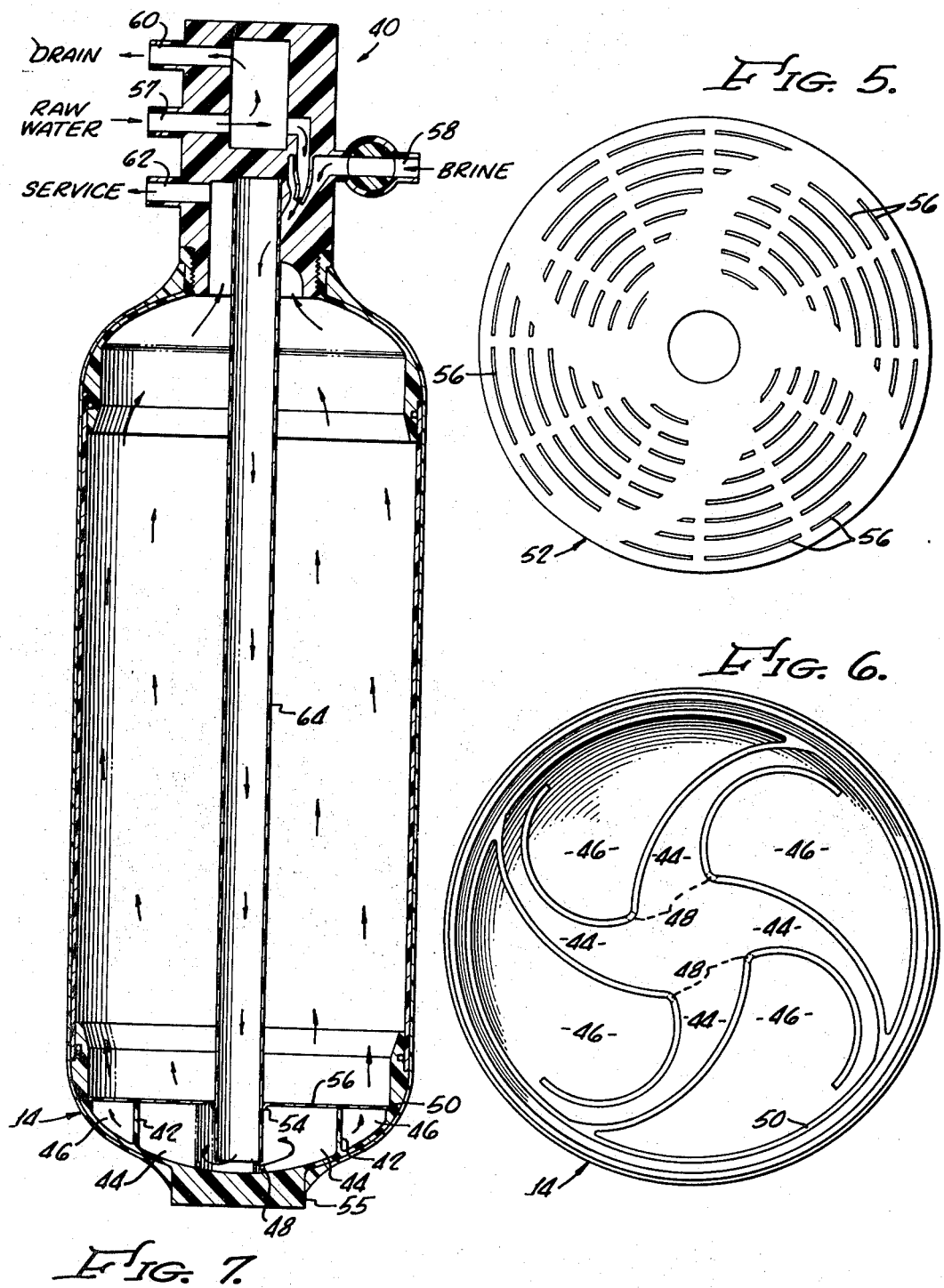

3,662,780

FLUID FLOW DIRECTING STRUCTURE FOR PRESSURE VESSEL

This is a division of application Ser. No. 679,304, filed Oct. 31, 1967, which has matured into U.S. Pat. No. 3,557,827, granted Jan. 26, 1971.

BACKGROUND OF THE INVENTION

This invention is directed to pressure vessels made from a light weight material and adapted to be filament wound. More specifically, this invention is directed to a water conditioner tank having fluid directing vanes integrally mounted on the internal surfaces of the tank for directing fluid flow through the conditioning media therein.

Typically, the liners for filament wound pressure vessels used for water conditioners, such as water softeners, are blow molded from polymers and copolymers or bag molded from fiber glass to form an integral liner having an opening in one end for receiving a fluid flow valve and a conduit for directing fluid flow through the interior of the conditioner. This liner is overwound with a fiber glass filament to form the final pressure vessel. These liners may also be formed from metals such as stainless steel wherein end members are welded on a central shell. The metal vessels have the detriments of being heavy, expensive and corrodible.

Normally a pipe-like hollow cylindrical conduit for directing fluids into and out of the vessel extends from the open end of the pressure vessel to slightly above the closed end. The conduit is surrounded by a water conditioning media such as an ion exchange resin. With two cycle water softening control valves, raw water flows downwardly through the conditioning media and upwardly through the conduit during the service cycle and a mixture of raw water and brine flows downwardly through the conduit and upwardly through the conditioning media during the regeneration cycle. With multicycle control valves, the direction of flow of the various fluids through the conduit may be reversed. The water conditioning media may be an ion exchange resin which removes calcium and magnesium cations from the raw water, thereby conditioning it or softening it for service use.

During the regeneration cycle brine flows through the ion exchange resin to replace the calcium and magnesium cations with sodium cations and backwash the resin. During both the regeneration cycle and the service cycle, the fluids flowing through the vessel are required to traverse the entire length of the vessel.

In the blow molded and bag molded pressure vessels, full advantage of the ion exchange resin is not obtained due to a "channeling" of fluids flowing through the resin surrounding the central conduit. "Channeling" may be defined as the tendency of the fluids to follow the path of least resistance through the vessel and thus to flow inwardly toward the central conduit and down the outer surface of the conduit. This usually occurs after the liquid flows axially a few inches from the end of the vessel at which it is injected into the resin. Since the blow molded pressure vessels are unitary, continuous bottle-like vessels, it is difficult to provide any structure on the interior of the vessel to direct fluid flow therethrough. Consequently, the channeling effect cannot be satisfactorily corrected with these pressure vessels of the prior art.

A further ever present problem with blow molded and bag molded, continuous, unitary pressure vessels is the difficulty in inspecting the integrity of the vessel and correcting local defects in the vessel. For example, if an end wall or the junction between the end wall and the side wall of the vessel, has a weakened section due to a defect in the blow molding process or an insufficient supply of the molding material to the system or some other such problem, the entire vessel must be discarded. Furthermore, the areas of highest stress for the vessels cannot easily be reinforced during the blow molding process since it is difficult to control the flow of the molding material during the process and to work inside the vessel after it is formed. Additionally, these vessels many times have imperfect bottom wall configurations due to pinch off of the mold.

Due to the unitary construction of the blow molded and bag molded pressure vessels, it is also difficult to vary the length of the vessels or to provide adequate fluid directing structure within the vessels for guiding fluids through the vessels. Often, such fluid directing means are needed to insure maximum efficiency in the use of the vessels. For example, in water conditioning vessels, some means for directing fluid flow through the conditioner tank is needed to assure maximum interface contact between the resin and the fluid passing through the tank and to eliminate the aforementioned channeling effect. The bag molded fiberglass vessels often form leaks by "wicking" i.e. capillary flow of the liquids through the fibers of the side walls.

Consequently, there is a present need for a light-weight, pressure vessel, adapted to be filament wound, which can be molded in several parts, each of which is capable of being inspected for defects or reinforced prior to assembly and filament winding to withstand localized stresses in the assembled vessel. There is also a need for a light weight pressure vessel which is resistant to corrosion and can be varied in length to accommodate any desired use of the vessel. Such a vessel must be easy to assemble in a fluid tight manner capable of withstanding service pressures and conditions without leakage or failure and must be formed from a liner having a smooth external surface to facilitate filament winding. Additionally, there is a need in the water conditioning field for such a vessel having adequate fluid directing members on the interior surfaces thereof for reducing channeling of the fluids passing through the water conditioning media with either the two cycle or other multicycle control valves.

SUMMARY OF INVENTION

Basically, this invention comprises a pressure vessel formed from a cylindrical central wall, or shell, and a pair of end caps constructed of a light weight resilient material. The cylindrical shell is open-ended and the end caps are mounted in each end of the shell to form an elongated vessel. Each of the end caps includes a convex, dome-like upper portion and a depending cylindrical skirt integrally connected to the upper portion and having substantially the same outer diameter as the central shell. The end caps are connected to the central shell by means which provide a substantially fluid tight seal between the end caps and the shell.

To effect the mounting of the end caps on the central shell, annular lands are connected to the cylindrical skirt of each of the end caps. Each of the annular lands has an outer diameter which is less than the outer diameter of the skirt so that a shoulder is formed at the junction between the land and the skirt. The radial dimension of the shoulder is substantially equal to the thickness of the central shell so that the lands fit snugly within the central shell and the outer surfaces of the skirt and the central shell form a smooth junction for filament overwinding. One of the caps may be provided with an opening for receiving a closure means for the vessel. A filament member may be tightly wound around about the end caps and the central shell to retain the end caps in the central shell and provide an integral, strong, pressure vessel.

The lands may be integrally connected to the end cap skirts or mounted on separate connector rings which are connected to the end caps in a fluid tight manner.

To provide a high strength pressure vessel which is able to withstand high bursting and compressive forces, it has been found that the length of the lands, i.e., the axial distance from the base of the shoulder to the opposite edge of the land should be at least three times the width of the contact between the sealing member and the central shell. Preferably the sealing member is a resilient O-ring which fits into an annular groove on each land. The outer diameter of the O-ring, in the preferred embodiment, is slightly larger than the outer diameter of the land and the inner diameter of the central shell, so that the O-ring is compressed when the land is inserted within the central shell.

The pressure vessel of this invention is particularly adapted for use as a fluid conditioning tank of the type used for water softeners. These tanks normally contain a central conduit which runs from a flow valve at one end of the tank to a position at substantially the other end of the tank. The portion of the central shell of the tank surrounding the conduit generally contains a fluid conditioning media such as an ion exchange resin. With the pressure vessel of this invention, it is possible to modify the inner surface of the end caps or the central shell to provide fluid directing vanes or other structure within the vessel before it is completely assembled. For example, in one embodiment of this invention a plurality of bifurcated fluid directing vanes each having a pair of curved arms are mounted in the end cap nearest the outlet from the conduit so that fluid flowing into the conditioning tank is channeled into a preselected flow pattern which substantially reduces "channeling."

Clearly, with the multipiece assembly of this invention, it is possible to produce vessels of any desired length and to include various fluid flow directing structure on the interior surfaces of the vessel. At the same time, the arrangement of the resilient seals on annular lands each having a length three times the axial length of contact between the sealing member and the central shell and having a smooth surface for overwinding provides a light weight, high strength, pressure vessel.

DESCRIPTION OF THE DRAWINGS

The novel features and advantages of the pressure vessel of this invention will become more readily apparent from the appended claims and the detailed description when taken with the accompanying drawings wherein:

FIG. 1 is a side perspective view of the pressure vessel of this invention;

FIG. 2 is an exploded perspective view of one embodiment of the pressure vessel of this invention showing the end cap members and a central cylindrical portion;

FIG. 4 is an enlarged sectional view of the pressure vessel end cap and central wall junction of FIG. 3 showing the filament winding on the outer surface thereof;

FIG. 5 is an enlarged plan view of the collector screen of this invention;

FIG. 6 is an enlarged plan view of the lower end cap as shown in FIG. 2;

FIG. 7 is a longitudinal sectional view of a water conditioner assembly using the pressure vessel of this invention.

DETAILED DESCRIPTION OF THE DRAWINGS

Figure 3:
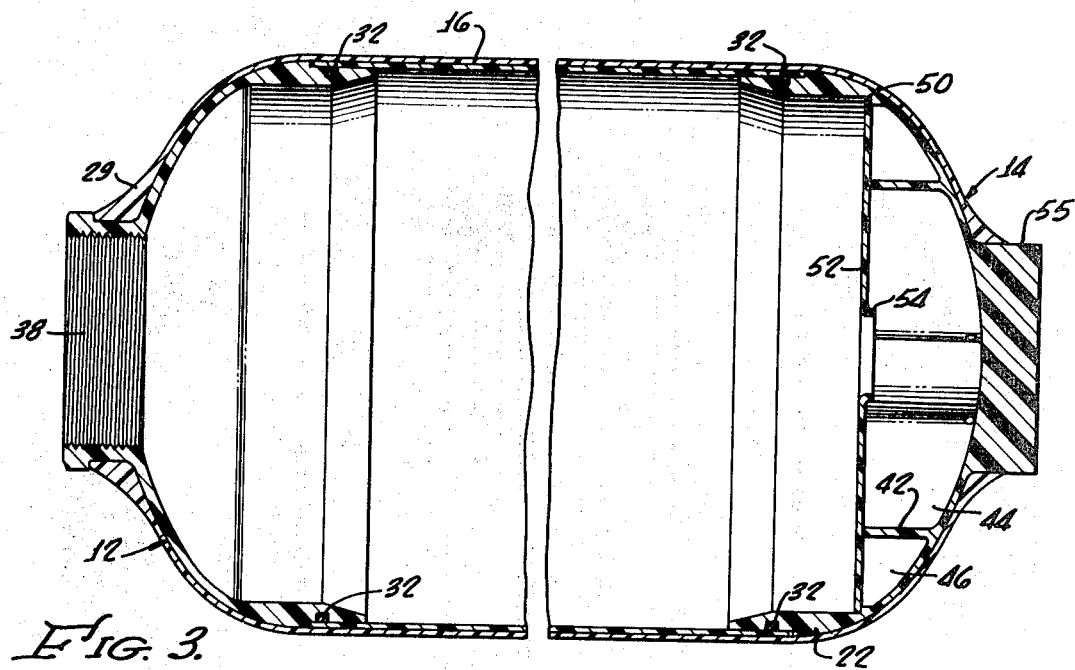
FIG. 3 is a longitudinal sectional view of a filament wound pressure vessel of the embodiment shown in FIG. 2.

Referring now to the drawings, FIG. 1 shows the general construction of the assembled pressure vessel 10 of this invention prior to filament winding. The vessel generally comprises a pair of upper and lower end cap members 12 and 14 fluid tightly mounted on a central elongated cylindrical side wall or shell 16.

Each of the end caps is of the same general external configuration. They each have a generally convex, dome-shaped end portion 20 integrally connected to a depending cylindrical skirt portion 22 (see FIG. 4). Each of the depending skirt portions 22 terminates in a reduced outer diameter annular land 24. The outer diameter of the land 24 is slightly less than the inner diameter of the shell 16. The junction between the upper portion of the skirt and the land forms a shoulder 26 which is of substantially the same radial length as the thickness of the central shell 16 so that when the end caps are mounted on the shell there is a substantially smooth transition on the external surface of the formed vessel from the end cap to the shell as shown in FIGS. 3 and 4. This provides a smooth surface for applying a filament winding 29 on the vessel.

Annular grooves 30 or other means are provided in each of the lands for receiving resilient sealing members such as the O-rings 32 shown in FIG. 2. The O-rings 32 are of a slightly greater outer diameter than the lands 24 so that when they are placed in the groove in the lands, the surfaces of the O-rings extend radially outwardly of the surface of the lands by few hundredths of an inch. The longitudinal extension of the lands 24 from the shoulders 26 to their opposite ends should be at least three times the width of the resilient sealing contact between the O-ring and the shell 16 and preferably, is at least seven times the width of the sealing contact to provide a relatively rigid annular support surface for mounting the end caps in the shell 16. The land can be longer than seven times the width of the sealing member, if desired, so long as it provides a good support for attachment of the end caps to the central shell. It has been found that by maintaining the surface area of the land at least three times the area of sealing contact, the pressure vessels are able to withstand very high pressures on the order of 750 psi after filament winding.

With continued reference to FIG. 4, it can be seen that the lower end of the depending land 24 is internally tapered from a point axially corresponding to the groove 30 for mounting the sealing member, O-ring 32, on the land. This taper provides some flexibility to the lower end of the land for mounting the end caps in the cylindrical shell 16. The lands of both the upper and lower end caps are tapered as shown in FIG. 4.

As best shown in FIG. 3, the upper end cap 12 is provided with an opening 38 which may be internally threaded for receiving a fluid control valve 40, diagrammatically shown in FIG. 7, or for receiving a pressure cap (not shown).

As shown in FIGS. 2 and 6, the lower end cap 14 is integrally molded with four upstanding, bifurcated diffuser vanes 42 on its internal surface. The vanes 42 each are formed from two intersecting curved arms and have one end and their lower edge integral with the end cap. They are arranged symmetrically about the axis of the end cap 14 so that the arms extend radially outwardly, as shown in FIG. 6, to form four curved channels 44 extending from the center of the end cap radially outwardly and terminating substantially tangentially to the cylindrical inner periphery of the end cap. The channels 44 decrease in cross-sectional area (see FIG. 6) as they increase in distance from the center of the end cap and empty into four open-topped chambers 46 intermediate the channels. Due to the curvature of the vanes and the convex end wall, the chambers 46 are wider at their outer edges but deeper near the center of the end caps. The upper edges of the vanes 42, as best shown in FIG. 3, are coplanar. The lower edges may be integral with the end cap and each vane is provided with a small diameter through-orifice 48 near the lower edge of the intersection of its arms for connecting the respective chamber 46 to the center of the end cap as shown in FIGS. 2, 3, and 6.

The lower end cap 14 is also provided with a flat annular internal shoulder 50 which is in substantially the same plane as that of the upper edges of the vanes, as best shown in FIG. 2, for mounting a collector screen 52. The shoulder 50 may be machined or molded into the lower end cap. The lower end cap may also be provided externally with an axially extending solid annular overwinding mount 55 as best shown in FIG. 3.

The collector screen 52, as shown in FIGS. 2, 3, and 5, comprises a centrally apertured disc having a downwardly extending annular flange or lip 54 about the central aperture. The collector screen 52 is further provided with concentric circumferentially extending openings or slots 56 at radially spaced locations on the disc to provide paths for fluid flow through the collector screen 52 which vary in capacity in proportion to the distance from the center of the disc. The slots are arranged to be aligned over the four chambers 46 defined by the vanes 42. The collector screen fits tightly on the top of the vanes 42 and may be bonded to the vanes by an appropriate adhesive to make the channels 44 substantially fluid tight and cause fluid to be directed upwardly through the vessel only from the chambers 46. The outermost circumferential slots 56 are larger and have a higher capacity than the innermost since, as shown in FIG. 6, they increase in length corresponding to the increase in width of the chambers 46 as the radial distance from the center of the disc increases.

The end caps 12 and 14 and central shell 16 of the pressure vessel may be constructed of any strong moldable or machineable material such as the polymeric plastics polyvinyl chloride, high density linear polyethylene or similar polymeric materials or metals such as brass and stainless steels. The preferred materials for use in manufacture of the pressure vessels are the acrylonitrile - butadiene - styrene resins (ABS resins) and their copolymers which have a tensile strength of about 6,500 psi at 73° F. a specific gravity of from about 0.99 to 1.05, a water absorption percent increase for a 24 hour period at 73° F of from 0.2 to 0.4 and a coefficient of linear thermal expansion in in/in/° C of less than $10.5 \times 10^{-5}$. The resilient seals may be constructed from any flexible, water resistant material such as neoprene or teflon. A 40 inch pressure vessel having a diameter of about 8 ¼ inches constructed from these materials has a nominal weight of about 11 pounds.

The pressure vessel of this invention is assembled by forcing the lands 24 of the end caps 12 and 14 into the cylindrical shell 16 so that the resilient O-rings 32 press tightly against the internal surface of the cylindrical shell (see FIG. 4) and provide a substantially fluid tight vessel. This is accomplished with relative ease due to the small amount of radial flexibility of the tapered portions of the lands and the resiliency of the O-rings. The ends of the shell abut against the shoulder 26 at the junction of the end cap lands 24 and skirt 22 to form a smooth external junction between the end caps and the shell. Any irregularities in the junction can be smoothed with an epoxy resin if necessary.

The vessel is then mounted on a filament winding machine (not shown) by means of the threaded opening 38 in the end cap 12 and the overwinding mount 55 of the end cap 14. The vessel is then overwound tightly with a polyester resin coated fiberglass filament to provide a light weight, unitary, integral pressure vessel capable of withstanding high bursting pressures. As shown in cross-sectional view in FIG. 3, only the threaded opening 38 and the solid overwinding mount 55 are not covered by the filament overwinding. The preferred overwinding material is clear silane glass coated with an isothalic base polyester resin. It has been found that an ABS resin vessel having a shell thickness of from 0.09 to 0.10 inches can be overwound to withstand internal pressures of about 750 psia. The ultimate strength of the vessel depends upon its dimensions, the particular materials used to construct the vessel, the type filament with which it is wound and the amount of overwinding. These can be selected to best fit the desired use for the vessel.

In the particular embodiment of the pressure vessel of this invention referred to in FIG. 2, and further shown in FIG. 7 a flow directing fitting 40 may be mounted in the upper opening of the end cap 12 for regulating fluid flow into the pressure vessel 10. The valve shown is functionally representative of the valves used for water conditioners or softeners for home and industrial service use. The valve has an inlet 57 for raw water from the service line and a valved inlet 58 for brine from a brine tank (not shown). The valve also has a drain line outlet 60 and a service line outlet 62. A central conduit 64 extends from the valve 40 to slightly above the inner surface of the lower end cap in the middle of the juncture of the channels 44 formed by the vanes 42. The entire valve and conduit may be formed from fiberglass. A water conditioning resin (not shown) such as zeolite is normally contained in the vessel around the conduit.

FIG. 7 shows the valve in the regenerating or bringing orientation wherein water enters through the valve inlet 57 on the left side of the valve and circulates passed a venturi and the brine line 58 into the conduit 64. As the raw water proceeds passed the venturi, a low pressure area is generated which, if the brine valve is open, causes brine to be drawn into the line and down through the central conduit 64 into the pressure vessel 10.

As shown in FIG. 7, the conduit 64 passes through the central aperture of the collector screen 52. Since the collector screen 52 is constructed of a resilient plastic, the flange 54 which extends about the central aperture thereof resiliently engages the outer surface of the cylindrical conduit 64 for maintaining the conduit in substantially fluid tight relationship with the central aperture of the collector screen 52.

During the regeneration cycle of the water conditioner, using the pressure vessel shown in FIG. 7, raw water enters through the water inlet 57 and passes through an inlet chamber and through the venturi causing brine to flow through inlet 58 from a brine tank (not shown) down through the central conduit 64 into the central portion of vanes 42. This raw water-brine mixture is directed out of the central portion of the lower end cap by the vanes 42 through the channels 44. Due to the constriction of the channels, as shown in FIGS. 2 and 6, the fluid is accelerated as it flows radially outwardly through the channels. The mixture, thus, is emitted tangentially into each of the chambers 46 at a relatively high flow rate with a spiraling motion. The outer wall of the end cap and the backs of the vanes 42 at the opposite side of each chamber 46 interrupt fluid flow and cause a high amount of turbulence in the chambers 46. The water-brine mixture under this high turbulence is forced through the openings 56 in the collector disc 52 and injected into the resin. This mixture maintains a high rate of flow and some of its turbulent spiraling motion as it passes upwardly through the resin. Since the capacity of the openings 56 of the outer edges of the disc 52 is greater than at the inner edges of the disc, a greater proportion of the mixture is injected into the resin through these outer openings tending to cause the fluid to move outwardly toward the shell 16 of the vessel. This combined effect of the vanes and collector screen substantially eliminates channeling against the interior conduit 64. The turbulence of the fluid mixture also provides a high amount of interface contact between the water-brine mixture and the ion exchange resin to fully utilize the resin.

As shown in FIG. 7, as the fluid reaches the upper end cap, it is directed inwardly toward the conduit by the end cap and by the channeling effect which occurs at the upper portion of the chamber when the mixture has lost the momentum with which it was injected into the resin. The mixture is then collected around the upper end of the cylindrical conduit and passes out of the vessel through the drain outlet 60. The tapered inner surfaces of the end cap lands 24 assist in directing flow outwardly toward the shell 16.

During the service cycle of the water conditioner of FIG. 7, the water flow pattern is downwardly through the ion exchange resin, through the collector disc 52 on the lower end cap 14 into the chambers 46, through the orifices 48 and upwardly through the central conduit 64 into the service outlet 62. Since the capacity of the openings 56 in the collector disc 52 is greater near the outer periphery of the disc, the path of least resistance to fluid flow is through these radially spaced locations so that channeling is reduced during the service cycle also. The flange 54, by providing a substantially fluid tight fitting with conduit 64 also assists in reducing channeling and permitting full utilization of the resin. The outer edge of the collector disc 52 may be bonded to shoulder 50 by an appropriate bonding material to reduce any tendency of the fluids to flow along the inner surface of the shell 16.

Figure 8:
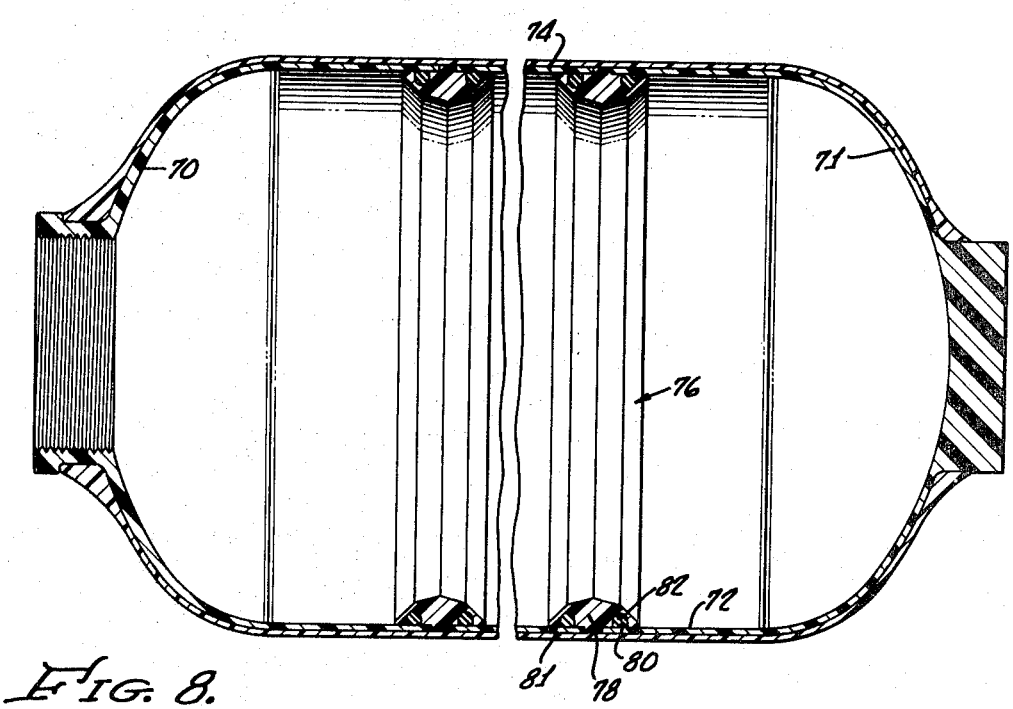
FIG. 8 is a longitudinal sectional view of another embodiment of the pressure vessel of this invention.

FIG. 8 illustrates another embodiment of the pressure vessel of this invention. In this embodiment, end caps 70 and 71 are each provided with a cylindrical skirt 72 which is of substantially the same thickness as the convex sections of the end caps. The end caps are joined to a cylindrical shell 74 by means of connector rings 76. The connector rings each comprise a central annularly extending shoulder 78 having an external diameter substantially equal to that of the cylindrical skirts on the end caps. The shoulders 78 of the connector rings are connected to a pair of annular lands 80 which extend in opposite directions from the shoulders as shown in FIG. 8.

Each land is provided with an annular groove 82 or other means for receiving a resilient sealing member such as the O-rings 84 shown in FIG. 8. The O-rings are of a slightly greater diameter than the depth of the grooves and thus protrude above the lands and must be compressed to fit the connector ring lands into the cylindrical skirts of the end caps and into the central shell of the pressure vessel body.

The internal surface of the connector ring may taper from the outer edge of the lands to a point behind each of the grooves to provide radial flexibility for the lands during insertion into the end caps and cylindrical shell of the vessel.

It has been found that the length of the connector ring lands, in this embodiment of the invention, must still be at least three times the width of the seal-end cap skirt or seal-shell interface and preferably should be at least seven times the width of the sealing contact interface to provide the highest bursting pressures for the vessels. The length of each land is measured from the respective radially extending side wall of the shoulder 78 to that edge of the connector ring. These dimensions have been found to be necessary to enable the pressure vessel to withstand high operating pressures and continue in service over extended period of time without leakage.

As shown in FIG. 8, the upper end cap is provided with a threaded opening, as discussed with respect to FIGS. 1 through 7, and the lower end cap is provided with an axially extending mounting member for facilitating mounting of the vessel during filament overwinding and for providing a reinforced base for the vessel.

The connector ring 76 shown in FIG. 8 can also be used to vary the length of the vessel by connecting a plurality of cylindrical shells to each other. The same end caps can thus be used with pressure vessels of any desired length. Materials used for constructing the end caps, the cylindrical shells, and the O-rings for the embodiment shown in FIG. 8 are the same as those discussed with respect to FIGS. 1 through 7. The connector rings may be constructed from the same materials as the end caps and cylindrical shells or similar polymeric resins or light weight metals.

While specific uses and structures of the internal fluid guide members for the pressure vessel of this invention have been discussed for purposes of illustration, it should be noted that the pressure vessel can be used for various purposes, such as for diving tanks and compressed air cylinders, and various appropriate fluid directing structure can be included therein, or omitted entirely, without departing from the spirit or essential characteristics of the invention. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In combination with a pressure vessel having interiorly thereof a cylindrical wall component, the improvement which comprises: means for directing fluid flow including a plurality of bifurcated vanes defining radially extending curved fluid flow channels which terminate substantially tangentially to the inner surfaces of said cylindrical wall component to cause said fluids to pass out of said channels under high turbulence.

2. A combination as defined in claim 1 wherein said channels decrease in cross-sectional area from the center portion of said cylindrical wall component outwardly to accelerate the rate of fluid flow therethrough.

3. A combination as defined in claim 1 wherein said vanes define chambers intermediate said channels and further comprising closure means over said channels for causing fluids passing through said channels to flow from said chambers into the interior of said cylindrical wall component.

4. A combination as defined in claim 3 wherein said closure means comprises a collector disc mounted on the upper edge of said vanes, said collector disc having radially spaced openings therein in the portions of said disc which extend over said chambers, said openings being formed to vary in capacity from the central portion of said cylindrical wall component to the outer portions thereof with the highest capacity openings adjacent said outer portions.

5. A fluid conditioning tank assembly for use in treating a fluid by contacting it with a fluid conditioning media comprising:
   a cylindrical shell having at least one dome-like convex end;
   a hollow conduit entering the tank through one of its ends and extending through said cylindrical shell and terminating in a dome-like convex other end for transmitting fluids through said tank;
   fluid flow directing means defining a plurality of paths for fluid flow from the center of the dome-like convex end in which the hollow conduit terminates radially outwardly to the side walls of that dome-like convex end; and
   means connected to the dome-like convex end in which said hollow conduit terminates for restricting fluid flow between that dome-like convex end and said shell so that the resistance to fluid flow between that dome-like convex end and said shell decreases with the radial distance from the axis of said conditioning tank.

6. A fluid conditioning tank as defined in claim 5 wherein said fluid flow path defining means comprise a plurality of upstanding bifurcated vanes having curved radially extending arm portions thereon, said vanes being substantially symmetrically arranged about the center of the dome-like convex end in which the hollow conduit terminates and spaced from each other to define a plurality of fluid channels and chambers.

7. A fluid conditioning tank as defined in claim 6 wherein said means for restricting fluid flow between said shell and the dome-like convex end in which said hollow conduit terminates comprises a collector disc member fitted over said conduit in substantially fluid tight relationship therewith and mounted on the upstanding edges of said vanes in substantially fluid tight relationship with the wall of that dome-like convex end; said disc member having radially spaced openings in the portions of said disc member extending over said chambers for restricting to the openings in said disc member fluid flow between said shell and that dome-like convex end.

8. A fluid conditioning tank as defined in claim 6 including means in the dome-like convex end in which said hollow conduit terminates for providing limited direct fluid flow from said chambers to the center portion of that dome-like convex end.

* * * * *